US008555274B1

(12) United States Patent
Chawla et al.

(10) Patent No.: US 8,555,274 B1
(45) Date of Patent: Oct. 8, 2013

(54) VIRTUALIZED DESKTOP ALLOCATION SYSTEM USING VIRTUAL INFRASTRUCTURE

(75) Inventors: Puneet Chawla, Sunnyvale, CA (US); Jennifer-Ann M. Anderson, Palo Alto, CA (US); Gerald C. Chen, Palo Alto, CA (US); Junaid Qurashi, Los Altos, CA (US); Patrick Lin, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 2095 days.

(21) Appl. No.: 11/395,012

(22) Filed: Mar. 31, 2006

(51) Int. Cl.
*G06F 9/455* (2006.01)
*G06F 9/46* (2006.01)

(52) U.S. Cl.
USPC .............................................. 718/1; 718/104

(58) Field of Classification Search
None
See application file for complete search history.

(56) References Cited

U.S. PATENT DOCUMENTS

| | | | |
|---|---|---|---|
| 6,061,349 A * | 5/2000 | Coile et al. | 370/389 |
| 6,317,775 B1 * | 11/2001 | Coile et al. | 709/201 |
| 6,970,902 B1 * | 11/2005 | Moon | 709/201 |
| 7,577,959 B2 * | 8/2009 | Nguyen et al. | 718/105 |
| 7,694,082 B2 * | 4/2010 | Golding et al. | 711/154 |
| 2005/0060590 A1 * | 3/2005 | Bradley et al. | 713/320 |
| 2005/0108709 A1 * | 5/2005 | Sciandra et al. | 718/1 |

* cited by examiner

Primary Examiner — Camquy Truong

(57) ABSTRACT

A plurality of virtual machines (VMs) is established and maintained by virtualization software on one or more physical servers. Desktop management software operates to provide the VMs to remote users as virtualized desktops. The desktop management software includes a connection broker, that allows a remote user to select a type of virtualized desktop and initiate a desktop session. The desktop management software further includes lease management functionality, that ensures users are provided access to a particular virtualized desktop for only a fixed period of time. In addition, the desktop management software provides an administrative console, which allows an administrator to set various parameters, including QoS parameters, and parameters specifying the resources allocated to each user. The desktop management software interacts with lower level software to provide load-balancing functionality, that adjusts the resources provided to each VM based on the needs of the VM. The load-balancing functionality also ensures that QoS parameters are met, and that the parameters specifying the maximum resources allocated to each user are not exceeded.

29 Claims, 6 Drawing Sheets

VIRTUALIZED DESKTOP ALLOCATION SYSTEM USING VIRTUAL INFRASTRUCTURE

BACKGROUND OF THE INVENTION

1. Field of the Invention

This invention relates to virtualized computer systems, and, in particular, to a system and method for providing remote desktops on a virtualized computer platform.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater security, since the virtualization can isolate potentially unstable or unsafe software so that it cannot adversely affect the hardware state or system files required for running the physical (as opposed to virtual) hardware.

As is well known in the field of computer science, a virtual machine (VM) is a software abstraction—a "virtualization"—of an actual physical computer system. FIG. 1 shows one possible arrangement of a computer system 700 that implements virtualization. A VM 200, which in this system is a "guest," is installed on a "host platform," or simply "host," which will include system hardware 100, that is, a hardware platform, and one or more layers or co-resident components comprising system-level software, such as an operating system (OS) or similar software layer responsible for coordinating and mediating access to hardware resources.

As software, the code defining the VM will ultimately execute on the actual system hardware 100. As in almost all computers, this hardware will include one or more CPUs 110, some form of memory 130 (volatile or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware processors have also been developed to include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk 240 or similar virtualized mass storage device, and one or more virtual devices 270. Note that a disk—virtual 240 or physical 140—is also a "device," but is usually considered separately because of the important role it plays. All of the virtual hardware components of the VM may be implemented in software to emulate corresponding physical components. The guest system software includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-cored" architecture, in which more than one physical CPU is fabricated on a single chip, with its own set of functional units (such as a floating-point unit and an arithmetic/logic unit ALU), and can execute threads independently; multi-cored processors typically share only very limited resources, such as at least some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 1 illustrates multiple virtual processors 210, 211, . . . , 21$m$ (VCPU0, VCPU1, . . . , VCPUm) within the VM 200. Each virtualized processor in a VM may also be multi-cored, or multi-threaded, or both, depending on the virtualization. This invention may be used to advantage regardless of the number of processors the VMs are configured to have.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—referred to in this text as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, regardless of the structure of the particular virtualization software.

By way of illustration and example only, the figures show each VM running on a corresponding virtual machine monitor. The description of use of VMMs is also merely by way of common example. A VMM is usually a software component that virtualizes at least one hardware resource of some physical platform, so as to export a hardware interface to the VM corresponding to the hardware the VM "thinks" it is running on. As FIG. 1 illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use as, or as part of, the virtualization software—a "hosted" configuration (illustrated in FIG. 2) and a non-hosted configuration (illustrated in FIG. 1). In a hosted virtualized computer system, an existing, general-purpose operating system forms a "host" OS that is used to perform certain input/output (I/O) operations, alongside and sometimes at the request and direction of a virtualization software component such as the VMM 300. The host OS 420, which usually includes drivers 424 and supports applications 460 of its own, and the VMM (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 2 also illustrates some of the other components that are also often included in the VMM of a hosted virtualization system; many of these components are found in the VMM of a non-hosted system as well. For example, exception handlers 330 may be included to help context-switching (see again U.S. Pat. No. 6,496,847), and a direct execution engine 310 and a binary translator 320, often with an associated translation cache 325, may be included to provide execution speed while still preventing the VM from directly executing certain privileged instructions (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel 600—constructed specifically to provide efficient support for the VMs. This configuration is frequently referred to as being "non-hosted." Compared with a system in which VMMs (or other software components or layers with similar functionality) run directly on the hardware platform (such as shown in FIG. 2), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as any temporary "console" operating system 420 that, in some systems, is included for such operations as boot the system as a whole or enabling certain user interactions with the kernel. The console OS in FIG. 1 may be of the same type as the host OS in FIG. 2, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005).

The invention, or at least certain of the components included in the overall virtualization software to implement the invention, may also be implemented directly in a computer's primary OS. Moreover, certain of the components included in the overall virtualization software to implement the invention might even be implemented wholly or partially in hardware, for example in processor architectures intended to provide hardware support for virtual machines.

Remote Desktop Servers

In early multi-user computer systems, users at "dumb" terminals time-shared the resources of a central system. Although different users could be given different priorities, and an administrator at the central system could control more than the time-sharing users, all users were accessing the same non-customized hardware and software system resources and were presented with substantially the same interface. Moreover, some actions of one user during a session could often affect the sessions of other users.

Much more recently, remote desktop servers have been provided that allow users to access, via a network such as the Internet, a stand-alone computer ("desktop"). From the desktop, the user can run software applications provided by the remote desktop server, or access data provided by the remote desktop server. Remote desktops may be used, for example, by users performing data entry; by employees who wish to use a home computer to access a company's data or software applications, by software developers developing and testing applications on a remote system, or in any other circumstance in which the resources of a remote computer are desired. For example, the Citrix Presentation Server provides provisioning of terminal sessions on Windows Servers. In this case the remote desktop session does not provide complete isolation between terminal sessions. Thus, failure of one session may result in a crash that can bring down all other sessions running on the same physical server. Furthermore, in the event that one server needs to be taken down, there is no support for continuing on-going sessions on another physical server, or for check-pointing the session to store any changes.

In addition, some software applications must be rewritten in order to be ported to a remote desktop server. Rewriting applications is costly and time consuming, and not all applications may be available for a particular remote server. In addition, because remote desktop servers do not provide complete isolation, problems may arise in supporting multiple versions of the same application on different terminal sessions on the same server.

Surgient's Virtual Management Demo solution supports delivery of software packaged in a Virtual Machine through a web browser for demonstration purposes. Because Virtual Machines are used, isolation between terminal sessions may be achieved.

However, the Virtual Management Demo solution does not provide the facility to limit the resources used by each user across physical machines. As a result, Quality of Service (QoS) cannot be guaranteed, load-balancing cannot be performed, and performance of the system may be unreliable.

In many cases, the installation, configuration and ongoing operation of remote desktop servers can be quite complex and time consuming, and it can be inefficient in its use of hardware resources and the personnel resources of an IT department. What is needed therefore is an improved method and system for providing remote desktop access.

SUMMARY OF THE INVENTION

The invention generally relates to providing a system that enables users, from remote terminals, to access virtualized desktop computers, in the form of virtual machines, so as to be able to have working sessions that are isolated from the sessions of other users and that can be stored and even migrated to different physical platforms as the need arises, and that, according to certain rules, can even use a virtualized desktop that is at least partially and individually customized.

An interface layer, termed a desktop management server, comprises desktop management software with various functions that are described below. The desktop management software includes a connection broker, which allows a remote user to select a type of virtualized desktop and initiate a desktop session.

The specifics of the virtualized desktop provided to each user and of the sessions may be the same for all, but are preferably controlled according to rules enforced by desktop management software and may be individualized. Thus, for example, all the users in a group such as a Marketing department in a company could be presented only with department-specific virtualized desktops, such that all members of this group receive the same interface to identically configured virtual machines, with non-persistent storage such that their sessions are "erased" when they are ended, or according to a schedule. Members of, for example, a research group would more likely need to conduct sessions that extend over a longer time frame, with highly individualized computing needs, and possibly with greater need for resources such as bandwidth or memory; the desktop management software could provide these users with customized virtualized desktops and persistent session storage.

Some implementations of the invention provide load balancing and other features to maximize resource allocation. In order to perform resource allocation, a plurality of "resource pool" parameters may be specified. Resource pool parameters are parameters that guarantee certain resources to certain VMs or groups of VMs.

Some resource pool parameters guarantee resources for a particular VM in the system, while other resource pool parameters are specified for a particular user. Resource pool parameters specified for a particular user may be referred to as "user private pool parameters," and the resources guaranteed to the user may be referred to as a "user private pool."

A "desktop session" is a connection to a virtualized desktop. In implementations of the invention, users may open a plurality of desktop sessions to access a plurality of virtualized desktops. Regardless of the number of virtualized desktops open, the user private pool parameters guarantee resources to the user across a cluster of physical machines.

When the user wishes to open a new virtualized desktop or perform an action using an existing virtualized desktop, it is first determined whether any of the resource pool parameters would be exceeded. If so, the user may be unable to open the new virtualized desktop or perform the action.

Lower level software provides load balancing capabilities based on the resource pool parameters. However, by assigning resource pool parameters to a particular user, the desktop management software creates a private resource pool for each user, thus allowing the lower level software to perform load balancing and other functionality for each user as well as for each physical machine.

In addition to the resource pool parameters, one or more QoS parameters may be specified. The QoS parameters may describe, for example, the maximum number of VMs that may be allocated to any one user, the maximum number of VMs that may run on each physical machine, and the maximum number of VMs that may be managed by each virtual machine management server. If opening a new desktop session or performing some other action would cause one of the QoS parameters to be exceeded, the action will not be allowed.

The QoS parameters thus specify the maximum load of the system, and the resource pool parameters specify the resources that are guaranteed to a user of VM. Requiring that the QoS parameters and the resource pool parameters are met may ensure acceptable performance of the system.

In one implementation, a method of providing a remote virtualized desktop to a user includes describing resource parameters for a user, the resource parameters specifying a maximum resource allocation for all virtual machines provided to a particular user, the resource parameters including at least one of a central processing unit (CPU) usage and a memory usage. The method further includes receiving a request for a remote virtualized desktop from the user and determining whether providing the virtualized desktop to the user would cause a resource parameter to be exceeded. The method further includes, if a resource parameter would not be exceeded, providing a connection between a remote terminal and the virtualized desktop, and if a resource parameter would be exceeded, denying the request for the remote virtualized desktop.

In another implementation, a method of providing a remote virtualized desktop to a user includes describing Quality of Service (QoS) parameters and receiving a request for a remote virtualized desktop from the user. The method further includes determining whether providing the virtualized desktop to the user would cause a QoS parameter to be exceeded. The method further includes, if a QoS parameter would not be exceeded, providing a connection between a remote terminal and the virtualized desktop, and if a QoS would be exceeded, denying the request for the remote virtualized desktop.

In another implementation, a method of providing a remote virtualized desktop to a user includes describing Quality of Service (QoS) parameters and receiving a request for a remote virtualized desktop from the user. The method further includes determining whether providing the virtualized desktop to the user would cause a QoS parameter to be exceeded. The method further includes, if a QoS parameter would not be exceeded, providing a connection between a remote terminal and the virtualized desktop, and if a QoS parameter would be exceeded, denying the request for the remote virtualized desktop.

DETAILED DESCRIPTION

Figure 1:
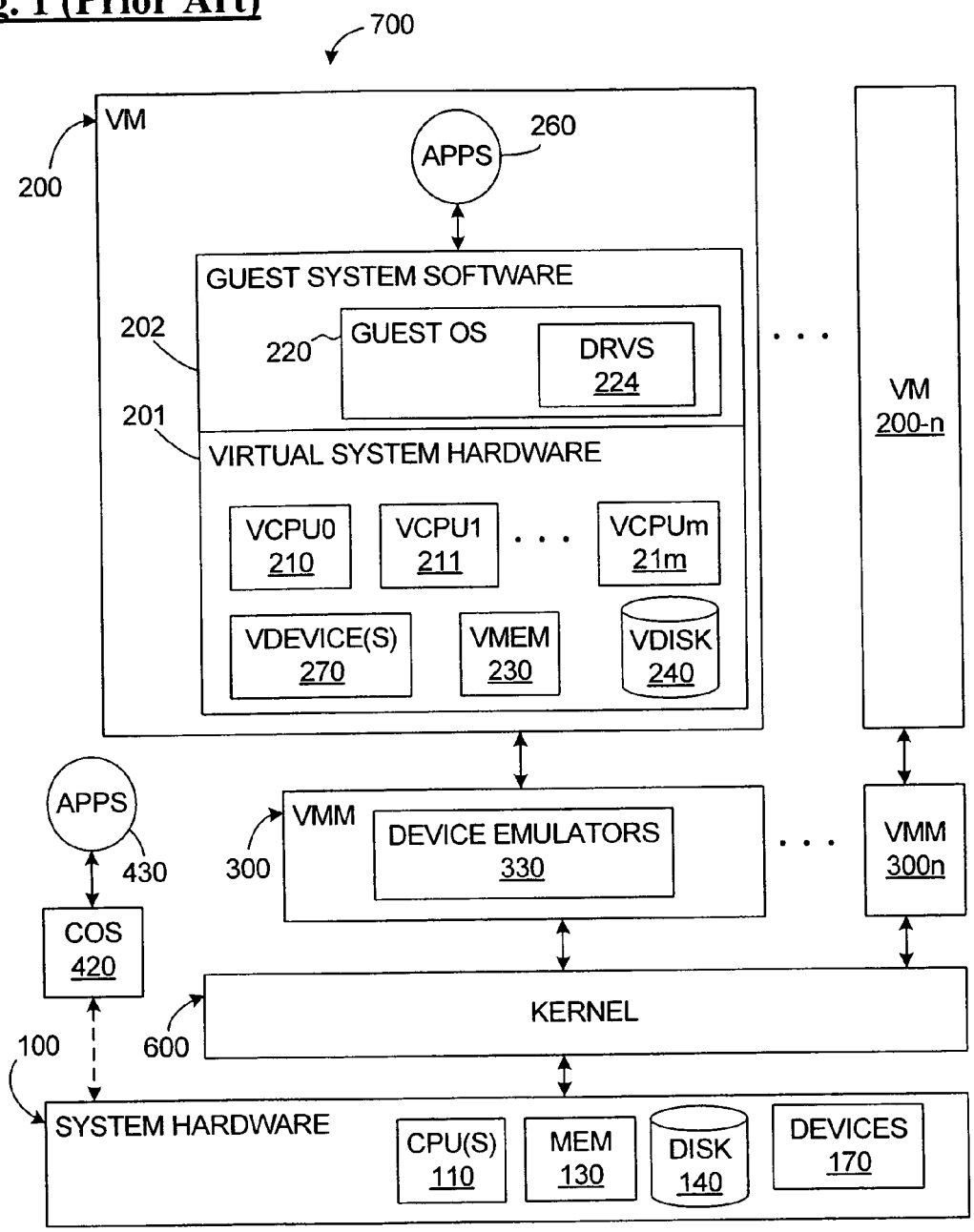
FIG. 1 illustrates the main components of a generalized kernel-based hosted virtual computer system (prior art).
Figure 2:
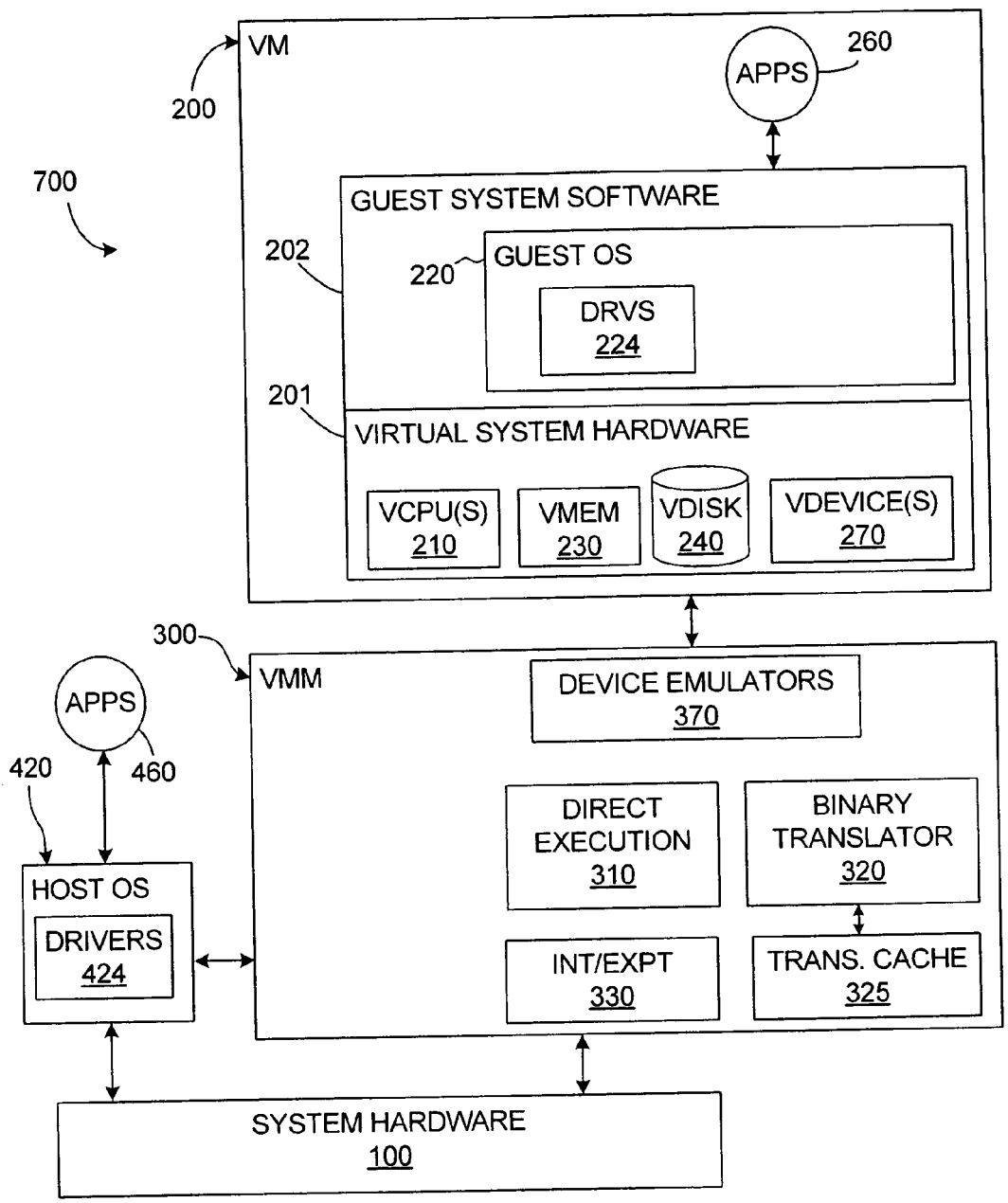
FIG. 2 illustrates the main components of a generalized hosted virtual computer system (prior art).

Embodiments of this invention may be implemented in a wide variety of computers having a wide variety of hardware architectures and configurations, as long as an interface is provided that allows the architecture to be virtualized. Furthermore, embodiments of the invention may be implemented in a wide variety of groups of computers, where all computers in the group may have a common hardware architecture and configuration, or with any combination of computers having a wide variety of different hardware architectures and/or configurations. Thus, for example, the invention may be implemented in a large corporate computer network having many server computers, with each server having the same hardware architecture, such as the x86 architecture, or with the network of computers comprising a variety of servers having some mix of hardware architectures.

The invention may also be used to execute a wide variety of individual software applications or any combination of a wide variety of different software applications. The invention is particularly useful, however, for providing remote desktop sessions to remote users using a virtualized computer platform. A remote desktop session, for example, may comprise a connection to a virtualized desktop that is remote from the user, wherein the user accesses the virtualized desktop via a network. The user may input information to the virtualized desktop, and may receive information from the virtualized desktop, for example, using a graphical user interface (GUI) presented on a terminal local to the user.

Embodiments of the invention may be implemented as middleware that acts as a broker between a user and a centralized data center. Such a broker would allow applications executing at the centralized data center to be accessed by a remote user.

Embodiments of the invention may be used to provide primary and/or secondary desktops. A primary desktop includes, for example, an operating system that executes directly on actual or virtualized hardware, and one or more applications that execute on the operating system. Primary desktops may be remotely provided, for example, when secure or sensitive information is to be transmitted, or when inexpensive desktops are desired. A remote user may be provided with simple, inexpensive thin-client hardware and software, and desktop information may be stored in a central server. The thin client hardware boots a limited functionality operating system from the local disk or from the network and directly connects to the remote desktop for providing access to all the applications. In some implementations, features such as clipboard copy and paste may be disabled on the remote terminals to protect sensitive information. Remote primary desktops may be provided, for example, to customer service representatives or other employees, in fields such as banking, healthcare, and the like. Such a solution might be particularly useful when the employees are outsourced workers.

Implementations of the invention may also provide secondary desktops. A secondary desktop may be an additional desktop that is provided in addition to a primary desktop. A secondary desktop may include, for example, a remote desktop which runs some software applications that are not available on the user's primary desktop. For example, a software company may develop software to operate on a plurality of different operating systems. Quality Assurance (QA) employees may be provided access to a number of secondary desktops, each running a different operating system. This may assist the QA employees in testing the software on a plurality of different operating systems. Further, if the remote secondary desktop is located in a company's data center it will be closer to the data. This results in performance optimizations for applications like databases, web servers, application servers, email servers etc.

Figure 3A:
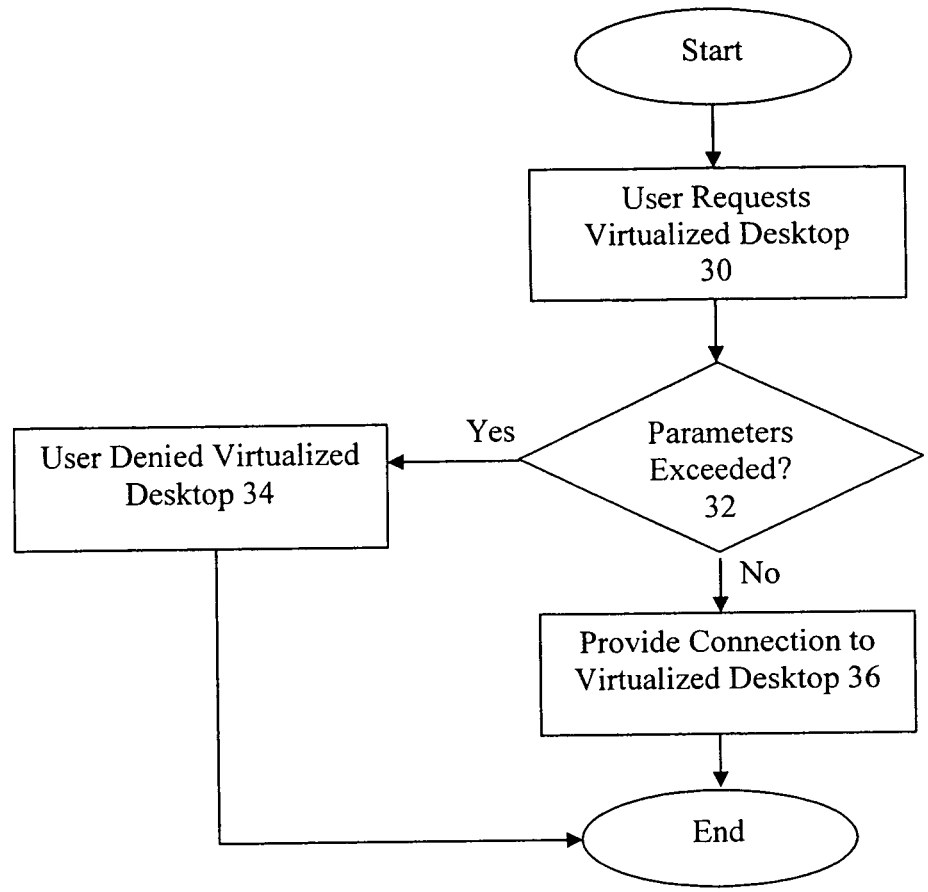
FIG. 3a illustrates a method for providing a connection to a virtualized desktop, in accordance with embodiments of the present invention.

FIG. 3a is a flow chart illustrating a method for providing a user with a virtualized desktop. As shown in FIG. 3a, the method may begin in step 30, wherein a user may request a virtualized desktop. The method may begin in step 32, wherein it may be determined whether providing a connection to the desktop would cause any parameters to be exceeded. If any parameters would be exceeded, the user may be denied the virtualized desktop in step 34. However, if no parameters would be exceeded, the user may be provided with a connection to the virtualized desktop in step 36.

The parameters used in the method of FIG. 3a may include resource pool parameters and QoS parameters. Resource pool parameters may be used to guarantee resources for a particular VM or group of VMs in the system. In addition, resource pool parameters may be used to guarantee resources for a particular user. Lower level software provides load balancing capabilities based on the resource pool parameters.

In addition to the resource pool parameters, one or more QoS parameters may be specified. The QoS parameters may include, for example, the maximum number of VMs that may be allocated to any one user, the maximum number of VMs that may run on each physical machine, and the maximum number of VMs that may be managed by each virtual machine management server. If opening a new desktop session or performing, some other action would cause one of the QoS parameters to be exceeded, the action will not be allowed.

If it is determined that providing a connection to a virtualized desktop would cause the resource pool parameters and/or the QoS parameters to be exceeded in step 32, the connection will be denied in step 34. Because the resource pool parameters and QoS parameters cannot be exceeded, the resources and QoS specified by the parameters can be guaranteed.

Hardware Overview

Figure 3:
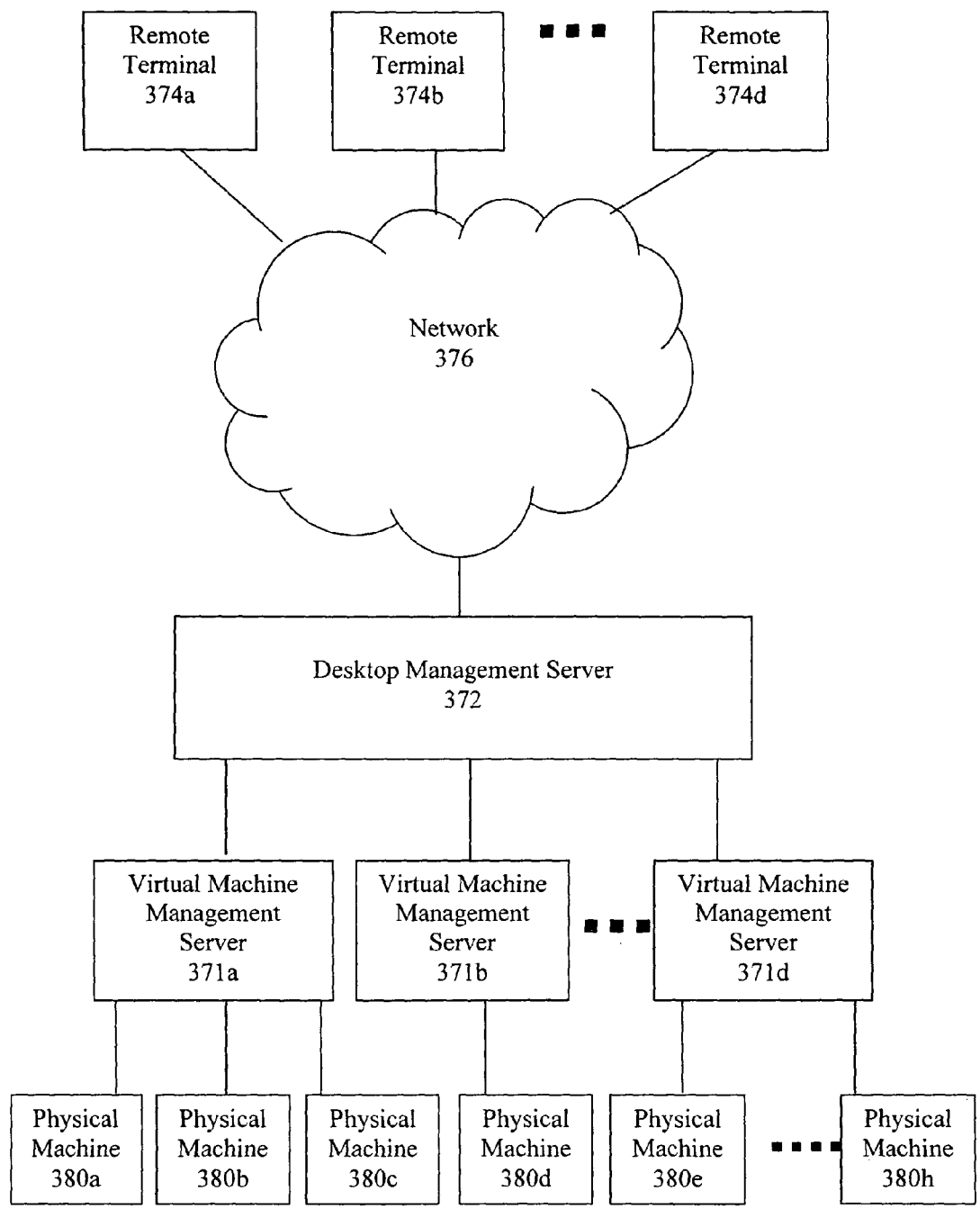
FIG. 3 illustrates a system of hardware components that may be used in embodiments of the present invention.

FIG. 3 illustrates hardware components that may be used in some implementations of the present invention. As shown in FIG. 3, a set of physical machines 380 may be used to support remote desktop provision. The physical machines 380 may include servers, database systems or other storage systems, any other appropriate physical computers, or any combination thereof.

Each of the physical machines 380 may be in communication with a virtual machine management server 371, which provides a software interface to create, power on, and manage VMs residing on the physical machines 380. Each of the virtual machine management servers 371 may be in communication with a virtual desktop management server, which, for the sake of brevity, is referred to below simply as the "desktop management server" 372, which may be used to provide users with remote desktops using the VMs. In order to provide a user with a virtualized desktop, that is, access to a virtual machine that appears and functions essentially as a stand-alone desktop computer, the desktop server 372 may allocate a VM to the user. The virtualized desktop may be provided to the user on a physical computer terminal 374 via a network 376, such as the Internet, an intranet, a local area network (LAN), a wide area network (WAN), a wireless network, and the like.

In order to provide a virtualized desktop to a user, the desktop management server 372 may provide various functionalities. For example, the desktop management server 372 may provide lease management services to ensure that a user's lease on a virtualized desktop has not expired. The desktop management server 372 may also provide inventory management services, used to manage resources, such as creating additional VMs or adding additional servers. Lease management and inventory management are discussed further with reference to FIGS. 4-5.

The desktop management server may also provide an administrative console (not shown in FIG. 3) that may be used by an administrator. The administrator may access the administrative console via a remote physical terminal 374, or via a physical terminal in direct communication with the desktop management server. The administrative console may be used, for example, to set QoS parameters for various VMs or for the system as a whole. The administrative console may also be used to create groups of VMs, such as, for example, groups of VMs that include similar or cloned VMs, or groups of VMs that are available to specific types of users. The administrative console may also be used to set user permissions, such as, for example, specifying a "lease" (the amount of time that a user has access to VMs), and to set other user parameters and QoS parameters, such as the number of virtualized desktops that may be allocated to a given user, the resources that are available to the user, or the types of VMs that a user may access. The administrative console is described further with reference to FIGS. 4-5.

The desktop management server 372 also provides a connection broker (not shown in FIG. 3) that allows users to access remote virtualized desktops. The connection broker located on the desktop management server 372 may work in conjunction with software located on the remote terminals 374 to provide users a connection to the remote desktop. In some implementations, the connection broker may be a web portal that allows users access to virtualized desktops via a web browser located on the remote terminal 374. In other implementations, specialized software may be provided on the remote terminal 374, that communicates with the connection broker to provide access to the virtualized desktop. The specialized software may be, for example, so-called "thin-client" software that uses minimal resources on the remote computers 374. In yet other embodiments, the connection broker communicates directly with the operating system software located on the remote computers 374, and the operating system is used to provide access to the virtualized desktop. Software that allows a user at a remote terminal to connect to a server to request and enable access to server-provided resources is well understood in the art.

As mentioned above, the invention makes it possible to provide either a primary remote virtualized desktop to a user, or a secondary virtualized desktop. Provision of a primary desktop may be used where a user's remote terminal does not have the full functionality of a normal desktop computer; in other words, the remote terminal is essentially "dumb," with minimal hardware support necessary, but is provided with a thin layer of software that enables it to connect through the network 376 to the desktop management server 372, to present the appropriate interface to the user, and to communicate user input back to the desktop management server so that the VM assigned to the user as a virtualized remote desktop can operate according to the user's input. In short, the primary "computer" the user will do his work on will in fact be a virtual machine running on a different computer, which he accesses via the network. For example, the remote terminal may be implemented as a Linux box that does not include a web browser. In this case, the operating system on the remote terminal, or a specialized thin-client software application on the remote terminal, may be used to connect to the remote desktop.

In the case of a secondary desktop, the user will already have the services of a computer locally, but wants to be able to access the services of yet another computer. In essence, the user wants to have at least one fully functional computer in addition to the one she already is sitting at, but without needing more than one "box." If a secondary desktop is to be provided, the remote terminal may include additional hardware and software, up to and including being a "complete" computer, with an operating system, various applications, the full range of hardware, etc. In this case, a web browser or a more robust specialized software application may be used to connect to the remote desktop.

As discussed above, some implementations of the invention use resource pool parameters and QoS parameters to provide load balancing and other features to maximize resource allocation. Lower level software running, for example, on the Virtual Machine Management servers 371, provides load balancing capabilities based on the resource pool parameters, as well as guaranteeing that the resource pool parameters and QoS parameters will not be exceeded. Load balancing, resource pool parameters, and QoS parameters will be discussed further with reference to FIG. 5.

Software Overview

Figure 4:
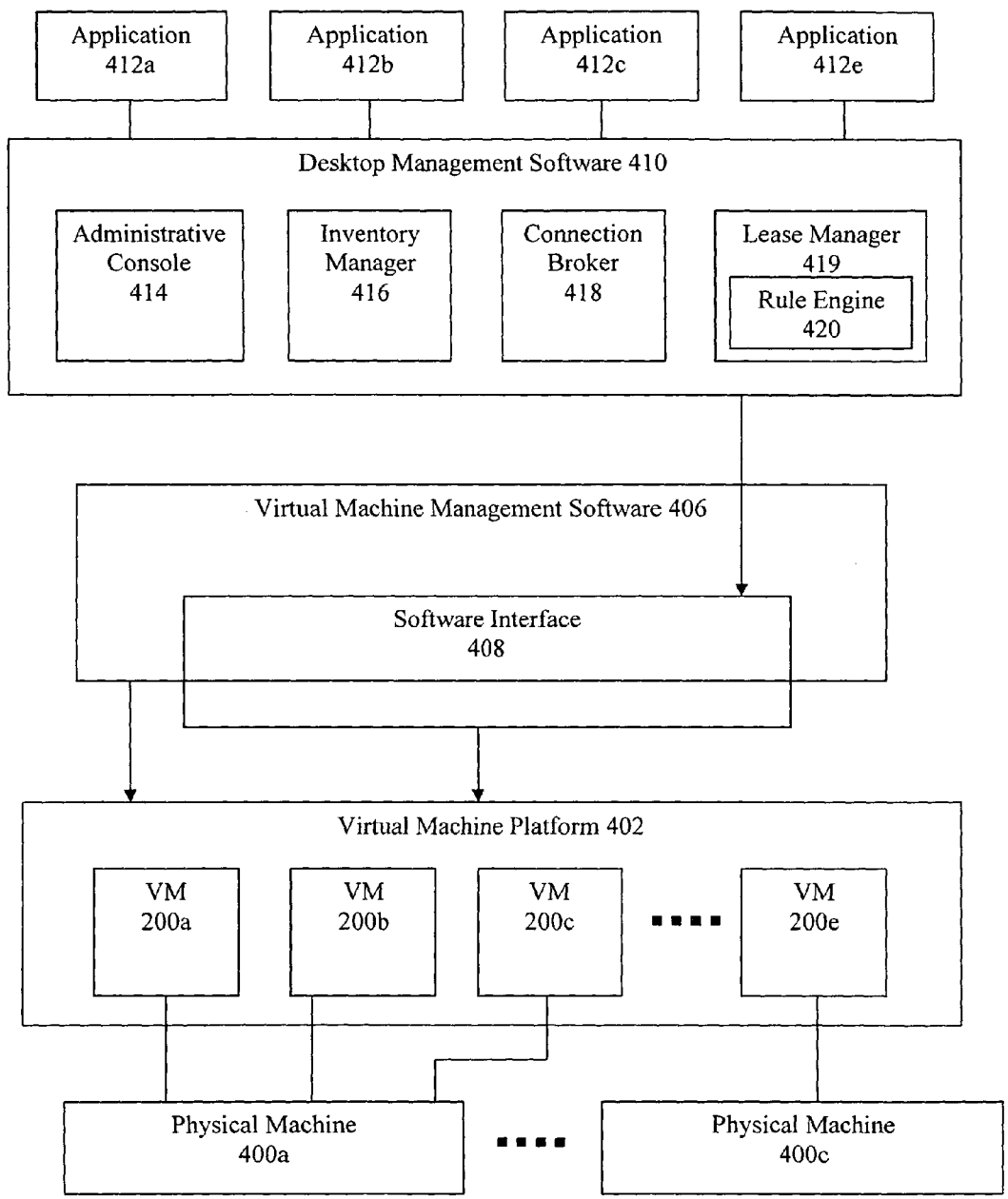
FIG. 4 illustrates a logical view of software components that may be used in embodiments of the present invention.

FIG. 4 is a logical view of software modules that are used in conjunction with some embodiments of the present invention. As shown in FIG. 4, a plurality of physical machines 400 may be provided. The physical machines 400 may include servers, such as desktop management servers, database servers, and the like, and may also include other physical machines. A virtual machine platform 402 includes a plurality of VMs 200, which use the resources provided by the physical machines 400 (which, although not software, are shown to further understanding of the preferred software hierarchy.). Virtual machine management server 406 provides any known mechanism to create and/or manage the VMs 200. The virtual machine management server software 406 preferably includes a software interface 408 that provides functionality to create, monitor, and manage the VMs 200. For example, the software interface 408 may be used to monitor the CPU usage and memory usage of each VM 200, as well as to determine whether each VM 200 is active or powered off; such software is commercially available from VMware, Inc.

Desktop management software 410 may be used to provide remote desktop access using the VMs 200. The desktop management software 410 may reside, for example, on the desktop management server 372. The desktop management software may access and modify the VMs 200 via the software interface 408 and the virtual machine management software 406, in order to provision the VMs for remote desktop access. Once the VMs have been provisioned for remote desktop access by the desktop management software 410, applications 412 may execute on the VMs 200.

The virtual machine management software 406 may comprise management software that provides access to the VMs 200. The virtual machine management software 406 may include a GUI that allows administrators or other users to manage the VMs 200. For example, the GUI may be used to create, power on, power off, and monitor the VMs 200.

The virtual machine management software 406 may provide for the provisioning of new VMs. The virtual machine management software 406 may also be used in conjunction with the desktop management software 410 to allocate computing resources. For example, the desktop management software 410 may be used to set resource pool parameters such as user private pool parameters. The virtual machine management software 406 may ensure that resource pool parameters and/or QoS parameters are met, by denying a connection to a virtualized desktop if such a connection would cause parameters to be exceeded. The virtual machine management software may also allocate computing resources based on the resource pool parameters and/or QoS parameters. Allocation of resources will be discussed further with reference to FIG. 5.

Virtualized Desktop Management

The desktop management software 410 provides remote access to virtualized desktops implemented by the virtual machines 200. In order to obtain a virtualized desktop, a user provides authentication information and is presented with a list of virtualized desktops that are available, or a list of types of virtualized desktops that are available, based on the user's permissions. The user may select a virtualized desktop or type of virtualized desktop from the list to initiate a connection to a VM 200. The session may have a fixed lease indicating the amount of time for which the user may access the VM 200. In order to provide remote virtualized desktops, the desktop management software 410 may include an administrative console 414, an inventory manager 416, a connection broker 418, and a lease manager 419, which may be used in managing the virtual machines 200 to provide virtualized desktops.

Figure 5:
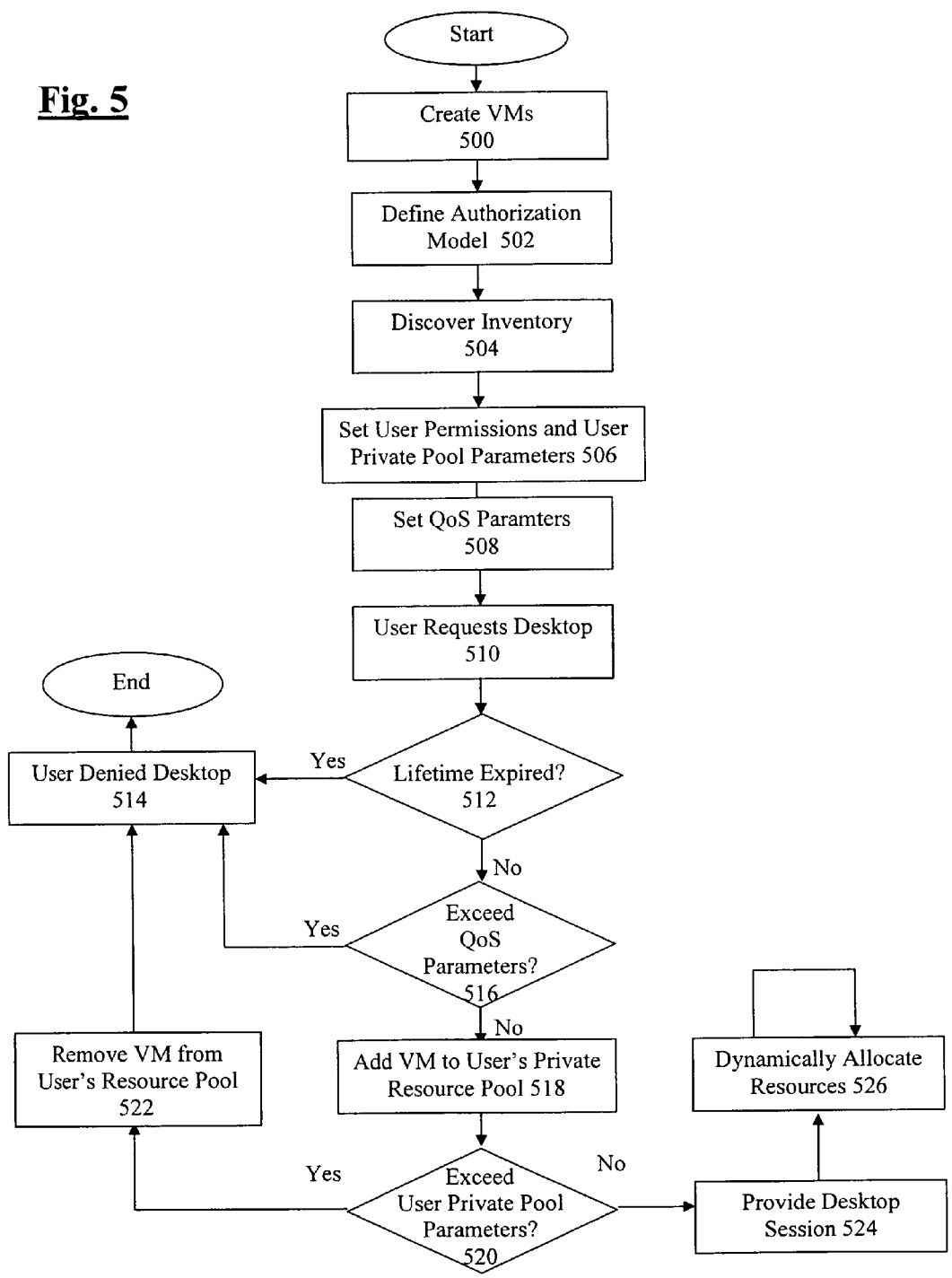
FIG. 5 is a flow chart illustrating a method for providing a remote user with a virtualized desktop, in accordance with some embodiments of the present invention.

Referring to FIGS. 4 and 5, in order to provide one or more virtual machines to act as remote desktops, an administrator may first create the VMs 200 in step 500. The administrator may create the VMs, for example, using the virtual machine management software 406, or using the administrative console 414, which interfaces with the software interface 408. The administrator may also configure the VMs 200 for remote access using procedures that are defined by the virtualization interface for each virtualizable architecture.

In step 502, an authorization model may be designated for each VM. The authorization model may be defined, for example, by an administrator using the administrative console. Alternatively, definition of the authorization model may be partially or wholly automated. Defining an authorization model may include, for example, designating each VM 200 as either private (available only to a single user), or public (available to any user with the appropriate permissions). If a VM 200 is private, the administrator may designate users who are permitted to use the VM 200.

Defining an authorization model may also include creating one or more logical groups of VMs 200. Each logical group may contain similar VMs 200. For example, a logical group may include VMs that have the same virtualized hardware platform. As another example, a logical group may contain VMs that run the same set of software applications. As yet another example, a logical group may contain a set of cloned VMs that are identical in every aspect. Other logical groupings may be used as circumstances dictate.

In some implementations, private VMs are not included in any logical groupings of VMs 200. In these implementations, only public VMs are placed into logical groupings. A user may then have permission to access any public VM in a particular logical grouping.

Furthermore, in some implementations, each VM 200 may be designated as either persistent or non-persistent. This designation may be made by an administrator using the administrative console, or may be set automatically. The state of the persistent VMs may be stored, for example, in the physical machine 380, in an external file system, in shared storage or in another storage medium, while the state of the non-persistent VMs may not be stored. In some implementations, private databases may be set to be persistent, allowing the user of a private machine to alter the virtualized desktop, while public databases may be set to be non-persistent.

For example, a department of an organization may include a plurality of data-entry clerks and a manager. The manager may be provided access to a private persistent VM, and the data-entry clerks may be provided access to a logical grouping of public non-persistent VMs. The data-entry clerks may use any VM in the logical grouping to perform data entry, for example, in a database. However, because the VMs in the logical grouping are non-persistent, no changes may be made to the public VMs. This may ensure that the data-entry clerks obtain consistent desktops regardless of which VM in the logical grouping is being used, and provide an additional layer of security. However, because the manager has access to a persistent VM, changes to the desktop may be made by the manager. For example, the manager may create files using an application 412, and store those files on the desktop executing in the persistent VM.

Furthermore, because the VMs in the logical grouping are public, the system may be used to support more users than VMs. For example, when a data-entry clerk working a day shift logs off from a particular VM, the VM may be made available for a member of a night shift. In contrast, because the manager's VM is private, the manager need not worry that other users may have accessed the VM and altered or viewed the files or other information stored thereon.

The inventory manager 416 may be used to create and maintain an inventory of VMs 200 in the system. The inventory manager 416 may create a logical view of the inventory, for example, by using the software interface 408 to perform inventory discovery. The logical view of the inventory may include details for each VM in the system, such as, for example, the name of the VM, the name of the ESX server or other server hosting the VM, the operating system used by the VM, and the username(s) of the user(s) with access to the machine. The inventory manager 416 may store the logical view of the inventory in a database, such as a relational database. The inventory manager may also routinely poll for changes in the VMs, and may write any changes to the database. Furthermore, other software modules may query the inventory manager to obtain information regarding the VMs. The inventory manager may then access the information stored in the database and provide the appropriate information to the other software modules.

The administrative console 414 may query the inventory manager in order to retrieve information regarding the VMs. The information may be provided to an administrator, for example, using a GUI. The administrator may also make changes to the parameters and settings of the system or of the individual VMs using the GUI provided by the administrative console. Changes may be implemented via the software interface 408. If any changes are made to the parameters or configuration of a VM, the administrative console may transmit these changes to the inventory manager 416, so that the changes may be reflected in the logical view of the inventory stored in the database. Alternatively, the inventory manager 416 may poll or register callback events for changes from the virtual machine management software and write the changes to the database when they are discovered.

The connection broker 418 may be used to provide users with access to the VMs 200. The connection broker 418 may present a user with a login screen and perform authentication, possibly in conjunction with other software modules. The connection broker 418 may then obtain a list of VMs or logical groups of VMs available to the user via the inventory manager 416, and allow the user to select a VM or type of VM from the list. In some implementations, the user may be given the option to reconnect to an active session (such as a private VM allocated to the user), or to begin a new session. In some alternate implementations, a VM may be assigned to a user without receiving a user selection. The inventory manager 416 may then use the software interface 408 to obtain the endpoint details of the VM. The endpoint details of the VM may include, for example, the Internet Protocol (IP) address of the appropriate VM, gateway information, or any other information used to create a connection between the user and the VM. The user is then permitted to access the VM, for example, using Remote Desktop Protocol (RDP), Virtual Networking Computing (VNC), or some other appropriate protocol. In some implementations, the connection broker 418 may transmit a descriptor file to the user's terminal, and the user may open the file to obtain access to the VM via a full-screen RDP session, an Active-X session viewed via a web browser, a Java applet embedded in a web browser or the like. Other implementations will occur to those skilled in the art.

The lease manager 419 may be used to ensure that a VM 200 is only allocated to a user for an appropriate time period. Using the administrative console, an administrator may specify a "lease" for one or more VMs 200. The lease may specify the period of time for which a user has access to a virtualized desktop. For example, a user may be provided with a lease of 8 hours. The lease for each VM 200 may be stored in the logical view by the inventory manager 416.

The lease manager 419 may periodically check for virtualized desktops with an expired lease. Any sessions with an expired lease may be disconnected, for example, by suspending the session or by powering off the VM. The VM may then be available for another user. The lease management functionality may thus provide additional flexibility to repurpose the resources used by the VM, for example, for use by workers in a different time zone, or for batch processing applications during off hours.

In some implementations, users may request a lease extension if they intend to use the VM for a longer duration. For example, a user who plans to work late may request a lease extension to ensure that the VM is not disconnected. In some implementations, the user may be notified about the end of the session through a pop-up browser window or an email notification.

In some implementations, lifetime management functionality may also be provided. Using the administrative console, an administrator may specify a "lifetime" for one or more users. The lifetime may specify the period of time for which a user has access to VMs. For example, a contract worker may be provided with a lifetime of 3 months. A lifetime manager may operate in a similar manner to the lease manager, and in some cases, may be integrated with the lease manager.

The lease manager may also contain a rule engine which can be used to automate the business rules of the organization. The rule engine includes a time based scheduling for managing the data center by controlling, for example, the power-on, power-off, and suspend operations for virtualized desktops. The rule engine may also control the migration of virtualized desktops from one physical server to another. Migration is performed without any downtime and is completely transparent from the user's perspective. Migration is described, for example, in co-pending patent application Ser. No. 10/319, 217, entitled "Virtual Machine Migration," filed on Dec. 12, 2002, which is incorporated herein by reference in its entirety. In addition to controlling, migration, the rule engine may also include the ability to automate the process of changing the resources allocated to the virtual machines in a timely fashion.

The rule engine may be configured to perform scheduled operations, such as powering on, powering off, suspending, and migrating virtualized desktops. The rule engine may perform such scheduled operations on a time-based schedule, as input, for example, by an administrator. The rule engine may also perform such scheduled operations in response to the expiration of a lease or the expiration of a virtualized desktop's lifetime.

For example, an offshore team may include 3 different shifts in a day, the shifts sharing the same resources. Due to security considerations, all the employees in the three shifts should have access to different virtualized desktops. In this case, an administrator may define a plurality of rules. For example, if a first shift works from 9:00 am to 5:00 pm, and a second shift begins at 6:00 pm, the administrator may define a first rule specifying that virtualized desktops numbered 101-200 should be powered on at 8:00 am, and a second rule specifying that virtualized desktops 101-200 should be powered off at 5:00 pm. This will ensure that these 100 virtualized desktops are available for the first shift. The administrator may also define a third rule specifying that virtualized desktops numbered 201-250 should be powered on at 5:30 pm. This will ensure that these 50 virtualized desktops are available for the second shift. Since the total physical resources are same in each shift, the resources available to each virtualized desktop in the second shift exceed the resources available to the each virtualized desktop in the first shift. The resource allocation may be performed automatically by the rule engine.

As another example, virtualized desktops may be provided to employees in the financial market. The financial market requires hardware for desktops as well as for servers running simulations, prediction programs, and the like. In this case, the rule engine may be used to allocate hardware to virtualized desktops during the day and to the servers at night. An administrator could define a first rule specifying that virtualized desktops numbered 301-400 should be powered on at 9:00 am, and define a second rule specifying that those virtualized desktops are to be suspended at 5:00 pm, when the market closes. The administrator could define a third rule specifying that a server numbered 501 should be powered on at 5:30 pm, in order to run simulations for next-day predictions. Thus, the server may use the same resources as the virtualized desktops, simplifying the cost and complexity of the hardware. The administrator could further define a fourth rule specifying that all the hardware should be powered off at 11:00 pm every night to save power.

In addition, the rule engine may be used to migrate virtualized desktops from one physical server to another. For example, during a daytime shift, 100 virtualized desktops may be provided on 10 physical servers. During the nighttime shift, it is anticipated that few workers will be using the virtualized desktops, and thus it is anticipated that fewer resources will be needed for the desktops. In this case, the 100 virtualized desktops may be consolidated onto 5 of the 10 physical servers, allowing the remaining physical servers to be powered down or used for other purposes. In some implementations, rules-based operations such as migration of virtualized machines may be performed only if resource pool parameters and QoS parameters are not exceeded by the migration. In other implementations, the rule engine may operate independently of the resource pool parameters and QoS parameters, and rules-based operations such as migration of virtualized machines may be performed regardless of resource pool parameters and QoS parameters.

The rule engine may thus provide the automation required to control the data center hardware. This allows multiple servers and/or virtualized desktops to share the same hardware on a time-managed basis.

Resource Pools and QoS Parameters

Some implementations of the invention allow various QoS parameters to be specified, and guarantee that the QoS parameters will be met. Furthermore, implementations of the invention provide load balancing and other features to maximize resource allocation.

In order to perform resource allocation, one or more "resource pool" parameters may be specified for each user. Resource pool parameters are parameters that guarantee certain resources to certain VMs or groups of VMs. Resource pool parameters that are specified for a particular user may be referred to as "user private pool parameters," and the resources guaranteed to the user may be referred to as a "user private pool."

In implementations of the invention, users may open a plurality of virtualized desktops, each virtualized desktop running on a VM 200. Regardless of the number of sessions open, the user private pool parameters guarantee resources to the user across a cluster of physical machines. Other resource pool parameters guarantee resources to each VM.

The user pool parameters specify a range of guaranteed resources to a user, and the other resource pool parameters specify a range of guaranteed resources to a VM or group of VMs. The actual resources provided to a user or VM will vary based on the needs to the user or VM. If additional resources are available, the resources provided to a VM may exceed the resource pool parameters; however, it is not guaranteed that resources in excess of the resource pool parameters can be provided.

The user pool parameters can be described by absolute compute resource metrics like GHz for CPU and MBytes for memory. The parameters can also be described in relative shares format. For example in a compute cluster of 10 hosts user A can be provided with 1000 shares out of the total 10000 shares and user B can be provided with 2000 shares. User B is automatically entitled to double resources compared to user A.

The resource pool parameters may be specified by an administrator using the administrative console, or may be specified by the administrative console based on the privileges of the user. Each resource pool parameter may specify a range of possible resources. For example, an administrator may specify using the administrative console 414 that a particular user, or a particular type of user, has a memory allocation between 128 MB and 2 GB, and a CPU usage between 300 MHz and 2.0 GHz. The user is thus guaranteed to have at least the minimum resources specified at all times, and the user is guaranteed to have up to the maximum resources specified, based on the user's needs. In some cases, where the entitlements are in relative shares format, if extra resources are available, the user may be provided with unused resources.

When the user wishes to open a new desktop session or perform an action using an existing desktop session, it is first determined whether any of the resource pool parameters would be exceeded. If so, the user may be unable to open the new desktop session or perform the action.

In addition to the resource pool parameters, one or more QoS parameters may be specified. The QoS parameters may describe, for example, the maximum number of VMs that may be allocated to any one user, the maximum number of VMs that may run on each physical machine, and the maximum number of VMs that may be managed by each virtual machine management server. If opening a new desktop session or performing some other action would cause one of the QoS parameters to be exceeded, the action will not be allowed. For example, QoS parameters may specify that each user may connect to no more than 5 VMs, that each physical machine may run no more than 500 VMs, and that each virtual machine management server may manage no more than 1000 VMs. When a user wishes to open a new desktop session, it is first determined whether all of the QoS parameters would be met. If the QoS parameters would not be met, the user may be unable to open the new desktop session or perform the action.

Since migration of desktops from one physical server to another will change the QoS parameters in a dynamic fashion, the desktop management software monitors the physical servers for such changes to maintain a consistent view of QoS parameters.

The QoS parameters thus specify the maximum load of the system, and the resource pool parameters specify the resources that are guaranteed to a user or VM. Requiring that the QoS parameters and the resource pool parameters are met may ensure acceptable performance of the system.

Lower level software may use resource pool parameters, for example, to specify the resources that are available on a particular physical machine and to ensure that the VMs running on the physical machine do not exceed the available resources. The lower level software thus provides load balancing capabilities based on the resource pool parameters. However, by assigning resource pool parameters to a particular user, the desktop management software creates a private resource pool for each user, thus allowing the lower level software to perform load balancing and other functionality for each user as well as for each physical machine.

Dynamic load balancing may thus be used to allocate resources such as processor time, memory and secondary storage, among other possible resources, between the multiple VMs supported by the virtualized computer platform, between the users of the system, and between the physical machines 400. Dynamic load balancing may also be used to distribute the VMs supported by the virtualized computer platform among the physical machines 400. Details of how the hierarchy of resource pools in a computer cluster are maintained, the admission control policy and the monitoring of physical hosts for distributed resource scheduling may be determined according to the needs of each situation and be implemented using other known routines.

Process Execution

FIG. 5 is a flow chart depicting a method for providing a remote desktop session to a user. As shown in FIG. 5, the method may begin in step 500, wherein one or more VMs 200 may be created.

The method may continue in step 502, wherein an authorization model may be defined for each VM. The authorization model may be defined, for example, by an administrator. Defining an authorization model 502 may include, for example, designating each VM 200 as public or private, and/or designating the user(s) permitted to use each VM. Defining an authorization model 502 may further include placing VMs into one or more logical groups of VMs. For example, a logical group of VMs could include a plurality of VMs with the same virtual architecture, a plurality of VMs running the same operating system, a plurality of VMs running the same applications, and the like.

The method may continue in step 504, wherein inventory discovery may be performed, for example, via an inventory manager. The inventory discovery may discover all VMs configured to provide remote desktop sessions. Information describing the discovered VMs may be stored in an external database like a relational database, object-oriented database, or the like, and a logical view of the discovered VMs may be presented to the administrator, for example, via an administrative console. The information stored in the relational database and the information presented to the administrator may include relevant data for each VM, such as the VM name, the resources available on the VM, the name of the physical machine hosting the VM, and the like. Inventory discovery may be performed 504 at any time during the method of FIG. 5. In particular, it is contemplated that inventory discovery may be performed routinely to ensure that the discovered inventory accurately reflects the state of the system. In one implementation, inventory discovery 502 may be performed any time a VM is added to the system, any time a server or other physical machine is added to the system, or any time a change is made to one of the VMs or physical machines in the system.

In step 506, user permissions and user private pool parameters may be set. The user permissions and user private pool parameters may be set, for example, by an administrator via an administrative console. The user permissions could include, for example, the duration of the lease for a user, the type(s) of VMs accessible to the user, and the like. The user private pool parameters could include, for example, resource pool parameters such as the range of CPU usage for the user, a range of memory usage for the user, and the like. The user private pool parameters are specified for a specific set of physical machines i.e. for a computer cluster.

In step 508, QoS parameters may be set. The QoS parameters may be set, for example, by an administrator via an administrative console. The QoS parameters could include, for example, the maximum number of VMs that may be allocated to any one user, the maximum number of VMs that may run on each physical machine, and the maximum number of VMs that may be managed by each virtual machine management r server While steps 500-508 have been illustrated as occurring first for the sake of clarity, steps 500, 502, 504, 506, and 508 could be executed at any time. For example, steps 502, 504, 506, and 508 could be executed for a newly created VM to allow the newly created VM to provide a remote desktop session. Steps 504, 506, and 508 could be executed at any time to adjust the parameters of the system or the VMs or to alter the logical groups of VMs. Some implementations of the system provide for real-time adjustments to these parameters, allowing changes to be made to the system without requiring system downtime.

In step 510, a user may request a virtualized desktop. For example, the user may present login credentials and be provided with a list of available virtualized desktops or types of virtualized desktops. In some implementations, the user is able to connect to an existing desktop session for that user, or to start a new session altogether. In this case, the list of available virtualized desktops may include all existing desktop sessions for the user, as well as all available virtualized desktops, or available types of virtualized desktops, which are accessible to the user. The user may then select a virtualized desktop from the list. Requesting a virtualized desktop 510 may be performed, for example, via a user console. For example, a user may have a private VM. This virtualized desktop is thus available only to that particular user, and the connection to that VM is thus considered an existing desktop session for that user. When the user logs into the system, the user may choose to reconnect to that existing desktop session, and/or to start a new desktop session.

In step 512, it may be determined whether the lifetime of the selected VM has expired. If the lifetime has expired, the user may be denied access to the selected virtualized desktop 514.

In step 516, it may be determined whether providing the VM to the user would cause the QoS parameters to be exceeded. If providing the VM would cause the QoS parameters to be exceeded, the user would be denied access to the selected virtualized desktop 514. In step 518, the requested VM may be added to the private resource pool for the user. In step 520, it may be determined whether the user private pool parameters can be met. Each user private resource pool specifies minimum and maximum resources that may be guaranteed to the user. In addition, each VM may specify the minimum and maximum resources that must be guaranteed for that VM. If the sum of the maximum resources for all the VMs assigned to a user exceeds the user private resource pool for that user, the maxima cannot be guaranteed for all the VMs simultaneously. In this case, the user will not be allowed to access the VM.

In one implementation, determining whether the user private pool parameters can be met includes attempting to power the VM on. If the user has elected to open a new desktop session, an available VM may be selected from the appropriate logical group of VMs, for example, using a round robin allocation policy, and based on parameters such as the maximum number of active sessions for each physical machine. The VM may be powered on, for example, using the software interface. The admission policy (i.e. the decision whether the power-on operation on the VM will not exceed the user resource pool parameters) is done by the lower layers. If the resource private pool parameters cannot be met, the VM will not be powered on, and the method will continue in step 522. If the user private pool parameters and all the other resource pool parameters can be met, the VM will be powered on, and the method will continue in step 524. If it is determined that the resource pool parameters are exceeded 520, the VM is removed from the user's private resource pool 522, and the user is denied access to the desktop 514.

In step 524, the desktop session may be made available to the user. If the user has elected to connect to an active desktop session, the endpoint details of the active desktop session may be retrieved via the inventory manager, and the desktop session may be initiated.

In the foregoing specification, the embodiments have been described with reference to specific elements thereof. It will, however, be evident to those of skill in the art that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than in a restrictive sense.

For example, the invention may be implemented as one or more computer programs or as one or more computer program modules embodied in one or more computer readable media, including any persistent or volatile storage or memory device. The computer readable media may be based on any existing or subsequently developed technology for embodying computer programs in a manner that enables them to be read by a computer. For example, the computer readable media may comprise one or more CDs (Compact Discs), one or more DVDs (Digital Versatile Discs), some form of flash memory device, a computer hard disk and/or some form of internal computer memory, to name just a few examples. An embodiment of the invention, in which one or more computer program modules is embodied in one or more computer readable media, may be made by writing the computer program modules to any combination of one or more computer readable media. Such an embodiment of the invention may be sold by enabling a customer to obtain a copy of the computer program modules in one or more computer readable media, regardless of the manner in which the customer obtains the copy of the computer program modules. Thus, for example, a computer program implementing the invention may be purchased electronically over the Internet and downloaded directly from a vendor's web server to the purchaser's computer, without any transference of any computer readable media. In such a case, writing the computer program to a hard disk of the web server to make it available over the Internet may be considered a making of the invention on the part of the vendor, and the purchase and download of the computer program by a customer may be considered a sale of the invention by the vendor, as well as a making of the invention by the customer.

What is claimed is:

1. A method of providing a remote virtualized desktop to a user, comprising:
    setting resource parameters for a user, each of the resource parameters specifying a maximum resource allocation for a resource for all virtual machines provided to a particular user at one time, the resource parameters comprising at least one of a central processing unit (CPU) usage or a memory usage;
    receiving a request from a remote computer or remote terminal associated with the user for a remote virtualized desktop;
    determining whether providing access to a virtual machine for providing the requested virtualized desktop would cause the maximum resource allocation of any of the resource parameters set for the user to be exceeded;
    if none of the maximum resource allocations of the set resource parameters would be exceeded, providing a connection between the remote computer or remote terminal and the virtual machine, thereby providing the remote virtualized desktop; and
    if at least one of the maximum resource allocations of the set resource parameters would be exceeded, denying the request for the remote virtualized desktop.

2. The method of claim 1, wherein a plurality of physical servers are partitioned into a plurality of virtual machines that implement virtualized desktops, and wherein the virtual machine for providing the requested remote virtualized desktop is selected from the plurality of virtual machines.

3. The method of claim 1, wherein determining whether providing access to the virtual machine for providing the requested virtualized desktop would cause the maximum resource allocation of any of the resource parameters set for the user to be exceeded comprises:
    attempting to power on a virtual machine.

4. The method of claim 1, wherein determining whether providing access to the virtual machine for providing the requested virtualized desktop would cause the maximum resource allocation of any of the resource parameters set for the user to be exceeded comprises:
    associating the virtualized desktop into a pool of virtualized desktops associated the user; and
    determining whether a sum of resources allocated to the virtualized desktops in the pool exceeds one of the resource parameters.

5. The method of claim 1, wherein the user has access to a plurality of virtualized desktops located on a plurality of physical servers.

6. The method of claim 1, wherein the connection has a fixed lease.

7. The method of claim 6, further comprising:
    if the lease has expired, disconnecting the provided virtual machine from the remote terminal or remote computer.

8. The method of claim 1, wherein the provided virtualized desktop is designated as a private desktop available only to a specified user.

9. The method of claim 1, wherein the provided virtualized desktop is designated as a public desktop available to any user with appropriate permission.

10. The method of claim 1, wherein the virtualized desktop is a member of a logical group of virtualized desktops.

11. A non-transitory computer-readable medium containing content that controls a processor, when executed, to perform a method comprising:
in response to a request for a virtualized desktop to be provided to a particular user,
associating the virtualized desktop with the particular user by adding the virtualized desktop to a resource pool for the particular user;
conditionally providing a connection between a remote terminal or remote computer and the virtualized desktop if a maximum amount of resources guaranteed to the resource pool for the particular user are not exceeded, thereby guaranteeing, to the resource pool for the particular user at one time, a maximum amount of resources defined by one or more resource parameters; and
denying the request for the virtualized desktop if providing the connection exceeds the maximum amount of resources guaranteed to the resource pool of the particular user.

12. The computer-readable medium of claim 11, wherein the resource parameters of the resource pool comprise at least one of a central processing unit (CPU) usage and a memory usage.

13. The computer-readable medium of claim 11, the conditionally providing the connection between the remote terminal or remote computer and the virtualized desktop based upon guaranteed resources further comprising:
determining whether adding the virtualized desktop to the resource pool for the user would cause a value of a resource parameter of the one or more resource parameters to be exceeded.

14. The computer-readable medium of claim 13, the method further comprising: determining whether the sum of resources guaranteed to virtualized desktops in the resource pool exceeds one of the resource parameters.

15. The computer-readable of claim 11, the method further comprising: providing the connection between the remote terminal or remote computer and the virtualized desktop only when adding the virtualized desktop to the resource pool would not cause one of the resource parameters of the resource pool to be exceeded.

16. The computer-readable medium of claim 11 wherein the tangible medium is a computer memory and the content are instructions stored in the memory.

17. A method of providing a remote virtualized desktop to a user, comprising:
providing a plurality of Quality of Service (QoS) parameters, each of the QoS parameters having a value that describe a maximum load to service a particular user at one time;
receiving a request for a remote virtualized desktop from the user;
determining whether providing access to a virtual machine for providing the requested remote virtualized desktop would cause the value of one of the plurality of QoS parameters that describes the maximum load to service the particular user to be exceeded;
if none of the provided QoS parameter values would be exceeded, providing a connection between a remote terminal or remote computer and the virtual machine, thereby providing the requested remote virtualized desktop; and
if at least one of the QoS parameter values would be exceeded, denying the request for the remote virtualized desktop.

18. The method of claim 17, wherein a plurality of physical servers are partitioned into a plurality of virtual machines that implement virtualized desktops, and wherein the virtual machine for providing the requested remote virtualized desktop—is selected from the plurality of virtual machines.

19. The method of claim 17, wherein at least one of the plurality of QoS parameters describes the maximum number of virtual machines that may be allocated to any one user and/or describes the maximum number of virtual machines that may run on a physical server.

20. The method of claim 17, wherein at least one of the plurality of QoS parameters describes the maximum number of virtual machines that may be managed by a virtual machine management server.

21. The method of claim 17, wherein the user has access to a plurality of virtualized desktops located on a plurality of physical servers.

22. The method of claim 17, wherein the connection has a fixed lease.

23. The method of claim 22, further comprising:
if the lease has expired, disconnecting the provided virtual machine from the remote terminal or remote computer.

24. The method of claim 17, wherein the provided virtualized desktop is designated as a private desktop available only to a specified user.

25. The method of claim 17, wherein the provided virtualized desktop is designated as a public desktop available to any user with appropriate permission.

26. The method of claim 17, wherein the provided virtualized desktop is a member of a logical group of virtualized desktops.

27. A non-transitory computer-readable medium containing content that controls a processor, when executed, to perform a method comprising:
in response to a user request for a remote virtualized desktop,
determining whether providing access to a virtual machine for providing the requested remote virtualized desktop would cause the value of one of the plurality of QoS parameters that describes a maximum load to service the particular user to be exceeded;
providing a connection between a remote terminal or remote computer and the virtualized desktop if providing the connection would not cause a Quality of Service (QoS) parameter value to be exceeded; and
denying the user request for the remote virtualized desktop if providing the connection would cause a QoS parameter value to be exceeded,
wherein each of the QoS parameter values specifies a maximum load to service a particular user at one time.

28. The computer-readable medium of claim 27, wherein the QoS parameters comprise at least one of the maximum number of virtual machines that may be allocated to any one user, the maximum number of virtual machines that may run on a physical server, and/or the maximum number of virtual machines that may be managed by a virtual machine management server.

29. The computer-readable medium of claim 27 wherein the tangible medium is a computer memory and the content are instructions stored in the memory.

* * * * *